United States Patent [19]
Lisson et al.

[11] Patent Number: 6,096,117
[45] Date of Patent: Aug. 1, 2000

[54] AEROSOL FILTER HAVING FILTER LAYERS OF METAL GAUZE

[75] Inventors: Johann Lisson, Darmstadt; Viktor Gliha, Hanau; Klaus Blinn, Rödermark; Karl-Heinz Kleinschroth, Mörfelden-Walldorf, all of Germany

[73] Assignee: Siemens Aktiengesellschaft, Munich, Germany

[21] Appl. No.: 09/294,703

[22] Filed: Apr. 19, 1999

Related U.S. Application Data

[63] Continuation of application No. PCT/EP96/04523, Oct. 17, 1996.

[51] Int. Cl.$^7$ .................................................. B01D 39/12
[52] U.S. Cl. .............................. 95/273; 95/287; 55/482; 55/485; 55/487; 55/525; 96/191
[58] Field of Search ............................ 96/188, 189, 190, 96/191; 55/482, 485, 486, 487, 525, 526; 95/273, 287

[56] References Cited

U.S. PATENT DOCUMENTS

| | | | |
|---|---|---|---|
| 1,912,235 | 5/1933 | Winslow | 55/486 |
| 2,230,278 | 2/1941 | Walton | 55/487 |
| 2,514,623 | 7/1950 | Brown | 55/487 |
| 3,280,542 | 10/1966 | Heijnis | 55/487 |
| 3,448,862 | 6/1969 | Kudlaty | 55/487 |
| 3,659,402 | 5/1972 | Alliger | 55/487 |
| 3,880,626 | 4/1975 | Griwatz et al. | 55/487 |
| 4,359,329 | 11/1982 | Willeitner | 96/190 |
| 4,696,751 | 9/1987 | Eifling . | |
| 4,744,806 | 5/1988 | Ozolins et al. | 55/487 |

FOREIGN PATENT DOCUMENTS

| | | | |
|---|---|---|---|
| 2221068 | 10/1973 | Germany . | |
| 2541383 | 3/1977 | Germany . | |
| 2745141 | 4/1978 | Germany | 55/525 |
| 2931702 | 2/1981 | Germany . | |
| 698751 | 10/1953 | United Kingdom . | |
| 960640 | 6/1964 | United Kingdom . | |

OTHER PUBLICATIONS

"Dubbel Taschenbuch für Maschinenbau", 16$^{th}$ edition, Springer 1987, p. M 48.

*Primary Examiner*—David A. Simmons
*Assistant Examiner*—Robert A. Hopkins
*Attorney, Agent, or Firm*—Herbert L. Lerner; Laurence A. Greenberg; Werner H. Stemer

[57] ABSTRACT

In an aerosol filter having a number of coaxially disposed, approximately cylindrical filter areas, provision is made according to the invention for each filter area to have a metal gauze. Through the use of the metal gauze for the filter areas, the aerosol filter is simple to clean and is therefore reusable. In addition, such an aerosol filter is especially resistant to low and high temperatures and to corrosion.

10 Claims, 1 Drawing Sheet

… … …

AEROSOL FILTER HAVING FILTER LAYERS OF METAL GAUZE

CROSS-REFERENCE TO RELATED APPLICATION

This is a continuation of copending International Application PCT/EP96/04523, filed Oct. 17, 1996, which designated the United States.

BACKGROUND OF THE INVENTION

Field of the Invention

The invention relates to an aerosol filter having a number of coaxially disposed, approximately cylindrical filter areas.

During filtration, a medium to be filtered flows through a filter. In this case, depending on the type of medium to be filtered, a distinction is made between various filter types. To separate oil, aerosols or coalescers from the air or from liquids, aerosol filters (high-efficiency particulate air filters), as disclosed, for example, by the publication Dubbel "Taschenbuch fur Maschinenbau" (Pocketbook for Mechanical Engineering), 16th edition, Springer 1987, page M48, are normally used.

In such an aerosol filter having a number of coaxially disposed, approximately cylindrical filter areas, the medium to be filtered flows through the latter from inside to outside. In this case, the enlargement of the filter areas due to the increase in the cylinder radii brings about a decrease in the flow velocity of the medium through the filter area with increasing cylinder radius. This reduction in the flow velocity leads to intensified coalescing of oil droplets or aerosol particles. Finally, the oil droplets or aerosol particles, which thus become larger, are deflected from the direction of flow of the medium by the force of gravity on account of their increasing weight and are thus separated.

The filter areas normally consist of ceramic elements, glass fibers or synthetic nonwovens. However, these materials tend to absorb deposits of the medium to be filtered and therefore tend to become clogged. Such an aerosol filter therefore has to be exchanged even after a short time and replaced by new aerosol filters. However, in particular during the filtration of toxic or radioactive substances, any waste containing these substances is to be avoided.

SUMMARY OF THE INVENTION

It is accordingly an object of the invention to provide an aerosol filter that overcome the above-mentioned disadvantages of the prior art devices and methods of this general type.

With the foregoing and other objects in view there is provided, in accordance with the invention, an aerosol filter, including a number of coaxially disposed, approximately cylindrical filter areas, and each of the filter areas formed of a metal gauze.

The object of the invention is therefore to specify a regenerable aerosol filter that is also especially suitable for cleaning toxic and/or radioactive substances.

For an aerosol filter of the above-mentioned type, the object is achieved according to the invention in that the filter area or each filter area has a metal gauze.

As has surprisingly been found, the oils or aerosols to be filtered have less of a tendency to adhere to a metal gauze than to the conventional filter materials. In this case, the micro-roughness of the metal gauze, which micro-roughness is markedly smaller compared with a ceramic for example, has an especially favorable effect. Through the use of a metal gauze as the filter area for the aerosol filter, the latter can therefore be cleaned virtually free of residues. Even in the event of clogging, such a filter can be cleaned in a simple manner, for example by return bubbles, and can be supplied for reuse, so that additional waste is avoided.

In order to be able to preset a definable pore size for each filter area and thus adapt the aerosol filter to the flow profile of the medium in an especially effective manner, the metal gauze preferably includes a number of gauze layers consisting of metal wire. In this case, the pore size of the metal gauze is defined by a defining layer, which is carried by a distribution layer, which is coarser compared with the defining layer. The distribution layer is in turn advantageously carried by a supporting gauze layer, which in turn is coarser compared with the distribution layer. To avoid damage, the defining layer is covered by a protective layer on its side opposite the distribution layer.

In order to promote the agglomeration or coalescing of oil or aerosol droplets, the pore size of the metal gauze of each filter area advantageously increases with increasing cylinder radius of the filter area. As a result, especially effective separation of oils or aerosols is achieved.

The advantages of the invention lie in particular in the fact that an aerosol filter having a number of coaxially disposed, approximately cylindrical filter areas, of which each has a metal gauze, can be cleaned in a simple manner and is therefore regenerable. In addition, since oil or aerosol particles scarcely tend to adhere to such a metal gauze, such an aerosol filter has an especially long service life.

Other features which are considered as characteristic for the invention are set forth in the appended claims.

Although the invention is illustrated and described herein as embodied in an aerosol filter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
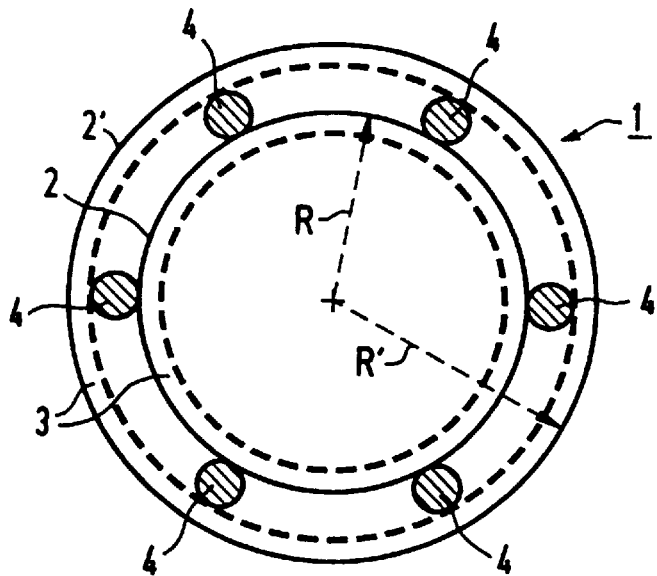
FIG. 1 is a diagrammatic, cross-sectional view of an aerosol filter with a number of filter areas according to the invention.

In all the figures of the drawing, sub-features and integral parts that correspond to one another bear the same reference symbol in each case. Referring now to the figures of the drawing in detail and first, particularly, to FIG. 1 thereof, there is shown an aerosol filter 1 having a number of coaxially disposed, approximately cylindrical filter areas 2, 2', of which two are shown in FIG. 1. In this case, each of the filter areas 2, 2' has a metal gauze 3 or metal weaving 3. The filter areas 2, 2' of the aerosol filter 1 are separated from one another by spacer elements 4. The spacer elements 4 ensure that a defined distance is maintained between each two filter areas 2, 2'.

Figure 2:
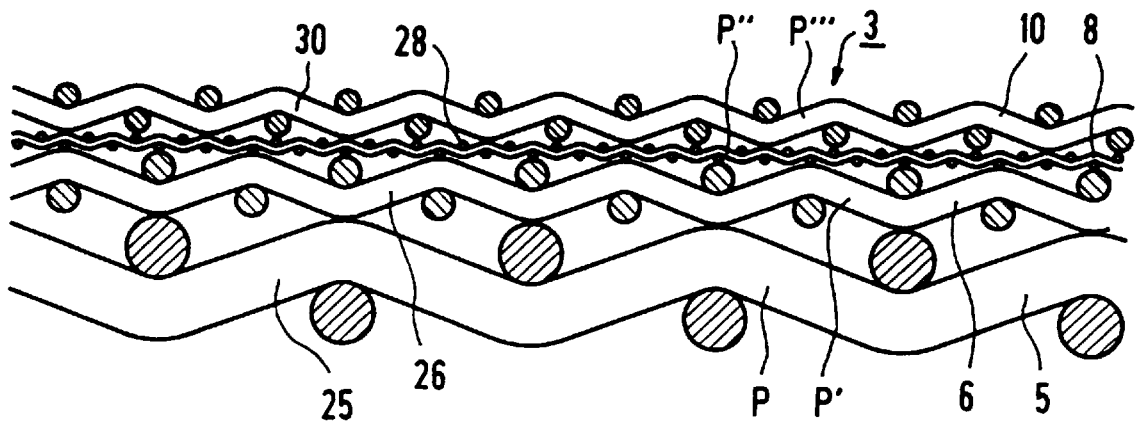
FIG. 2 is an enlarged, sectional view of a section of a metal gauze of the filter area.

As shown in FIG. 2, the metal gauze 3 is composed of various layers disposed one on top of the other. To this end, a supporting gauze layer 5, a distribution layer 6, a defining layer 8 and a protective layer 10 are disposed one above the other. Each of the gauze layers 5, 6, 8, 10 consists of a gauze of metal wire 25, 26, 28, 30, the thickness of the respective metal wire 25, 26, 28, 30 determining both the thickness and the size of pores P, P', P" and P'" respectively of the respective gauze layer 5, 6, 8 and 10. The pores being formed by adjacent metal wires 25, 26, 28, 30. As indicated in FIG. 2, the thickness of the metal wire 25, 26, 28, 30 varies, depending on the function of the respective gauze layer 5, 6, 8, 10. In this case, the defining layer 8 has the thinnest metal wire 28. The metal wire 28 is interwoven in such a way that pore sizes P" of the defining layer 8 of about a few mm are obtained. The pore size P" of the defining layer 8 defines which particle size is retained by a filter area 2, 2' having the metal gauze 3 and which particle size is let through.

The defining layer 8 is carried by the distribution layer 6, which has a comparatively coarser metal wire 26 and is in turn disposed on the supporting layer 5. The supporting layer 5, which is in turn composed of a thicker metal wire 25 compared with the metal wire 26 of the distribution layer 6, and the distribution layer 6 both have larger pore widths P, P' compared with the defining layer 8. The distribution layer 6 and the supporting layer 5 are therefore not decisive for a filtration per se. On the side remote from the distribution layer 6, the defining layer 8 is covered by the protective layer 10, which likewise has a coarser metal wire 30 and thus larger pores P'" than the defining layer 8.

For an especially resistant aerosol filter 1 having the metal gauze 3, the gauze layers 5, 6, 8, 10 of which are joined, for example, by welding, sintering or other joining processes, may be made of a corrosion-resistant alloy, such as, for example, Hastelloy or Carpenter, or of a heat-resistant alloy, such as, for example, Inconel.

Through the use of such a metal gauze 3 for the aerosol filter 1, a high resistance of the aerosol filter 1 to low and high temperatures as well as corrosion is achieved. In addition, such an aerosol filter 1 has especially high mechanical strength and shock resistance as well as high filtration accuracy. The aerosol filter 1 is simple to clean and can therefore be reused often.

The pore size of the metal gauze 3 of each filter area 2, 2' increases with increasing cylinder radius of the filter area 2, 2'. In the exemplary embodiment according to FIG. 1, the pores of all the gauze layers of the filter area 2' having a radius R' are therefore larger than the corresponding pores of the gauze layers of the filter area 2 having a radius R.

Due to the fact that the size of the filter area 2, 2' increases with the cylinder radius R, R', the flow velocity of the medium to be filtered decreases from inside to outside during the flow through the aerosol filter 1. Due to the reduction in velocity, oil or aerosol droplets, through coalescing effects, become increasingly larger and thus heavier with increasing cylinder radius R, R' of the filter areas 2, 2', so that they are separated by gravitation effects, preferably in the outer region of the aerosol filter 1. Since the metal gauze 3 can be worked in an especially simple and precise manner, the filter areas 2, 2', for example with regard to their configuration and the pore size of their metal gauze 3, can be adapted especially effectively to the flow profile of the medium to be filtered. As a result, especially effective filtration is achieved.

The aerosol filter 1 may be cleaned by return bubbles and thus be regenerated. Waste is therefore avoided through the use of the metal gauze 3 in the filter areas 2, 2' of the aerosol filter 1. In addition, the aerosol filter 1 has an especially long service life.

We claim:

1. An approximately cylindrical aerosol filter for filtering a fluid medium from inside the filter to outside the filter, comprising:

a number of coaxially disposed, approximately cylindrical filter areas, each of said filter areas having a metal gauze with metal wire gauze layers, and axis, and a cylinder radius; and spacers disposed between each respective pair of said filter areas, said gauze layers each including a defining layer having a pore size, at least one first layer and at least one second layer, said pore size of said defining layer of said gauze layers increasing with an increasing cylinder radius of said filter areas, said defining layer of each of said gauze layers being disposed between said at least one first layer and said at least one second layer, said at least one first layer being disposed nearer to said axis of said filter areas than said at least one second layer, and each of said at least one second layer of each of said gauze layers having a second layer pore size larger than said pore size of said defining layer in a respective one of said gauze layers.

2. The aerosol filter according to claim 1, wherein each of said at least one first layer includes at least one protective layer adjacent said defining layer.

3. A method for filtering a fluid medium including droplets, which comprises:

providing an approximately cylindrical aerosol filter having:

a filter axis;

approximately cylindrical shaped filter areas coaxially disposed in the filter on the filter axis;

a spacer element between each respective pair of filter areas;

each of the filter areas having a metal gauze with metal wire gauze layers;

each of the gauze layers having a defining layer with a pore size increasing with an increasing cylinder radius of the filter areas, at least one first layer, and at least one second layer;

the defining layer being disposed between the at least one first layer and the at least one second layer;

the at least one first layer being disposed nearer to the filter axis than the at least one second layer, and the at least one second layer having a second layer pore size larger than the pore size of the defining layer in a respective one of the gauze layers; and flowing the fluid medium through the filter from the inside of the filter to the outside of the filter for reducing the flow velocity of the fluid medium and increasing the droplets and for filtering the fluid medium.

4. The method according to claim 3, which comprises adapting the pore size of the defining layers and the spacer elements to the flow velocity of the fluid medium.

5. The method according to claim 3, wherein the flowing step is performed by flowing a fluid medium selected from the group consisting of toxic substances and radioactive substances through the filter.

6. The aerosol filter according to claim 1, wherein each of said at least one second layer includes a supporting layer supporting said defining layer.

7. The aerosol filter according to claim 1, wherein each of said at least one second layer includes a distribution layer adjacent to said defining layer.

8. The aerosol filter according to claim 1, wherein said pore size of said defining layer is not more than a few millimeters.

9. The aerosol filter according to claim 1, wherein said metal wire gauze layers have metal wires made of an alloy selected from the group consisting of corrosion-resistant alloys and heat-resistant alloys.

10. The aerosol filter according to claim 1, wherein said metal wire gauze layers have metal wires joined by at least one of the group consisting of welding and sintering.

* * * * *